(12) United States Patent
Vemuri (10) Patent No.: US 8,868,870 B1
(45) Date of Patent: Oct. 21, 2014

(54) SYSTEMS AND METHODS FOR MANAGING OFF-HOST STORAGE MIGRATION

(75) Inventor: Hari Krishna Vemuri, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 163 days.

(21) Appl. No.: 13/546,996

(22) Filed: Jul. 11, 2012

(51) Int. Cl.
  *G06F 13/00* (2006.01)
  *G06F 15/16* (2006.01)
  G06F 13/28 (2006.01)
  G06F 15/177 (2006.01)

(52) U.S. Cl.
  USPC ............ 711/165; 711/162; 709/217; 709/221

(58) Field of Classification Search
  None
  See application file for complete search history.

(56) References Cited

U.S. PATENT DOCUMENTS

| | | | |
|---|---|---|---|
| 8,387,127 B1* | 2/2013 | Narver et al. | 726/11 |
| 8,452,856 B1* | 5/2013 | Lent et al. | 709/219 |
| 2006/0155837 A1* | 7/2006 | Kobayashi et al. | 709/223 |
| 2007/0079100 A1* | 4/2007 | Shiga et al. | 711/170 |
| 2010/0070722 A1* | 3/2010 | Otani et al. | 711/162 |
| 2012/0054460 A1* | 3/2012 | Dai et al. | 711/165 |

OTHER PUBLICATIONS

Virtual Lifestyle; Recommended Detailed Material on RDM's; http://www.virtuallifestyle.nl/2010/01/recommended-detailed-material-on-rdms/, as accessed on Apr. 6, 2012.
Commvault Systems, Inc.; Simplified Data Management for iSCSI SANs; http://dell.commvault.com/files/Equallogic_White_Paper.pdf, as accessed on Apr. 6, 2012.
EMC Corportation; Using EMC CLARiiON with Microsoft Hyper-V Server; http://www.emc.com/collateral/hardware/white-papers/h6182-using-clariion-microsoft-hyper-v-wp.pdf, as accessed on Apr. 6, 2012.
Michael Hudak; Champion Solutions Groups Painless Data Migration White Paper; http://www.slideshare.net/mhudak/champion-solutions-groups-painless-data-migration-white-paper, as accessed on Apr. 6, 2012.
Patrick Allaire, et al; Reduce Costs and Risks for Data Migrations, Data Migration Best Practices and Nondisruptive Migration Service Capability for Enterprise Storage; http://www.hds.com/assets/pdf/white-paper-reducing-costs-and-risks-for-data-migrations.pdf, as accessed on Apr. 6, 2012.
Marc Winans, et al.; Data Migration Tips Part II, Storage 360; http://perspectivmarketing.com/newsroomdemo1/archive-sites/www-agilysysstorageblog-com/2011/05/25/data-migration-tips-part-ii/index.html, as accessed on Apr. 6, 2012.

(Continued)

*Primary Examiner* — Wen-Tai Lin
(74) *Attorney, Agent, or Firm* — ALG Intellectual Property, LLC (57) ABSTRACT

A method for managing migration may include detecting an attempt to perform migration from an existing off-host storage array to a new off-host storage array by 1) identifying a new communication path that appears to a host system as a path from the host system to the existing off-host storage array, 2) determining whether the new communication path comprises a standby path that is not actively being used for communication between the host system and the existing off-host storage array, 3) determining whether the new communication path actually comprises a path to the new storage array configured to appear to the host system as though it were the existing storage array, and 4) concluding that non-disruptive data migration is being attempted. The method may also include performing a management operation with respect to the new off-host storage array. Various other methods, systems, and computer-readable media are also disclosed.

20 Claims, 6 Drawing Sheets

(56) References Cited

OTHER PUBLICATIONS

HDS: Hitachi Universal Storage Platform (USP) V; http://www.hds.com/products/storage-systems/universal-storage-platform-v.html, as accessed on Apr. 6, 2012.

VMware, Inc.; VMware Storage VMotion, Live Migration of Virtual Machine Disk Files; http://www.vmware.com/products/storage-vmotion/overview.html, as accessed on Apr. 6, 2012.

Omni Training; Storage Virtualization Explained; http://omnitraining.net/storage-networking-101/319-storage-virtualization-explained, as accessed on Apr. 6, 2012.

EMC Corporation; EMC PowerPath Migration Enabler; http://india.emc.com/storage/powerpath/powerpath-migration-enabler.htm, as accessed on Apr. 6, 2012.

EMC; EMC Powerpath Migration Enabler; http://india.emc.com/collateral/hardware/data-sheet/h8570-ds-emc-powerpath-migration.pdf, as accessed on Apr. 6, 2012.

Techtarget; Block storage virtualisation led by array based solutions; http://searchstorage.techtarget.co.uk/feature/Block-storage-virtualisation-led-by-array-based-solutions, as accessed on Apr. 6, 2012.

\* cited by examiner

SYSTEMS AND METHODS FOR MANAGING OFF-HOST STORAGE MIGRATION

BACKGROUND

Storage array vendors may implement various solutions to provide seamless and non-disruptive migration of data from one storage array to another storage array. Unfortunately, in some situations, a host system that utilizes a storage array being migrated may not be configured to adequately identify or respond to the migration. What is needed, therefore, is a more effective and efficient solution for responding to and managing off-host storage-array migrations.

SUMMARY

As will be described in greater detail below, the instant disclosure generally relates to systems and methods for managing off-host storage migration.

In one example, a computer-implemented method for managing off-host storage migration may include detecting an attempt to perform non-disruptive data migration from an existing off-host storage array to a new off-host storage array by 1) identifying a new communication path that appears to a host system as a path from the host system to the existing off-host storage array, 2) determining whether the new communication path comprises a standby path that is not actively being used for communication between the host system and the existing off-host storage array, 3) when the new communication path is determined to comprise the standby path, determining whether the new communication path actually comprises a path to a new storage array configured to appear to the host system as though it were the existing off-host storage array, and 4) when the new communication path is determined to comprise the path to the new off-host storage array, concluding that the non-disruptive data migration is being attempted. The method may also include performing at least one management operation with respect to the new off-host storage array.

In some embodiments, performing the at least one management operation may include 1) detecting a configuration of the new off-host storage array, 2) determining that the configuration of the new off-host storage array is different than a configuration of the existing off-host storage array, and/or 3) changing, based on the difference between the existing off-host storage array and the new off-host storage array, at least one data allocation policy that defines how data is to be stored in the new off-host storage array. In such embodiments, the at least one data allocation policy may include a data tiering policy that identifies a first type of data that is to be stored to a higher-quality storage device and a second type of data that is to be stored to a lower-quality storage device.

According to various embodiments, determining whether the new communication path actually comprises a path to the new off-host storage array configured to appear to the host system as though it were the existing off-host storage array may include using an inband Small Computer System Interface (SCSI) inquiry command to determine that the new off-host storage array is different than the existing off-host storage array, where the inband SCSI inquiry command may be a generic command and/or a vendor-specific command specified by a vendor of the new and existing off-host storage arrays. Additionally or alternatively, determining whether the new communication path actually comprises a path to the new off-host storage array configured to appear to the host system as though it were the existing off-host storage array may include using an out-of-band array management interface to determine that the new communication path is from a different physical storage array than the existing off-host storage array. As another example, determining whether the new communication path actually comprises a path to the new off-host storage array may include detecting that a communication channel transport identifier for the new communication path does not belong to the existing off-host storage array.

In certain embodiments, the method may include determining that the non-disruptive data migration has completed by detecting at least one of the new communication path being activated and/or by detecting an existing path to the existing off-host storage array being changed to a standby mode. In such embodiments, the at least one management operation may be performed in response to determining that the non-disruptive data migration has completed. Performing the at least one management operation may include 1) identifying an application on the host system that stores data to the existing off-host storage array and 2) making the application aware of the new off-host storage array. Additionally or alternatively, performing the at least one management operation may include 1) identifying an application on the host system that stores data to the existing off-host storage array, 2) determining that only a portion of data being used by the application is being migrated from the existing off-host storage array to the new off-host storage array, and 3) in response to determining that only a portion of data being used by the application is being migrated from the existing off-host storage array to the new off-host storage array, performing the at least one management operation by remediating storage configuration for the application.

According to at least one embodiment, performing the at least one management operation may include notifying an administrator of the host system that data has been migrated from the existing off-host storage array to the new off-host storage array.

In one embodiment, a system for implementing the above-described method may include a detection module programmed to detect an attempt to perform non-disruptive data migration from an existing off-host storage array to a new off-host storage array by 1) identifying a new communication path that appears to a host system as a path from the host system to the existing off-host storage array, 2) determining whether the new communication path comprises a standby path that is not actively being used for communication between the host system and the existing off-host storage array, 3) when the new communication path is determined to comprise the standby path, determining whether the new communication path actually comprises a path to a new storage array configured to appear to the host system as though it were the existing off-host storage array, and 4) when the new communication path is determined to comprise the path to the new off-host storage array, concluding that the non-disruptive data migration is being attempted. The system may also include a management module programmed to perform at least one management operation with respect to the new off-host storage array and at least one processor configured to execute the detection module and the management module.

In some examples, the above-described method may be encoded as computer-readable instructions on a non-transitory computer-readable-storage medium. For example, a non-transitory computer-readable-storage medium may include one or more computer-executable instructions that, when executed by at least one processor of a computing device, may cause the computing device to detect an attempt to perform non-disruptive data migration from an existing off-host storage array to a new off-host storage array by 1)

identifying a new communication path that appears to a host system as a path from the host system to the existing off-host storage array, 2) determining whether the new communication path comprises a standby path that is not actively being used for communication between the host system and the existing off-host storage array, 3) when the new communication path is determined to comprise the standby path, determining whether the new communication path actually comprises a path to the new off-host storage array configured to appear to the host system as though it were the existing off-host storage array, and 4) when the new communication path is determined to comprise the path to the new off-host storage array, concluding that the non-disruptive data migration is being attempted. The computer-executable instructions may also cause the computing device to perform at least one management operation with respect to the new off-host storage array.

As will be explained in greater detail below, the system and methods described herein may detect off-host storage array migration processes that are being performed transparent to (e.g., without the knowledge of) a host system. By detecting such migrations, the systems and methods described herein may respond to and manage a host system's response to off-host migrations and may enable the host to perform failover operations, adjust storage policies, and/or perform a variety of other operations in response to off-host migrations.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
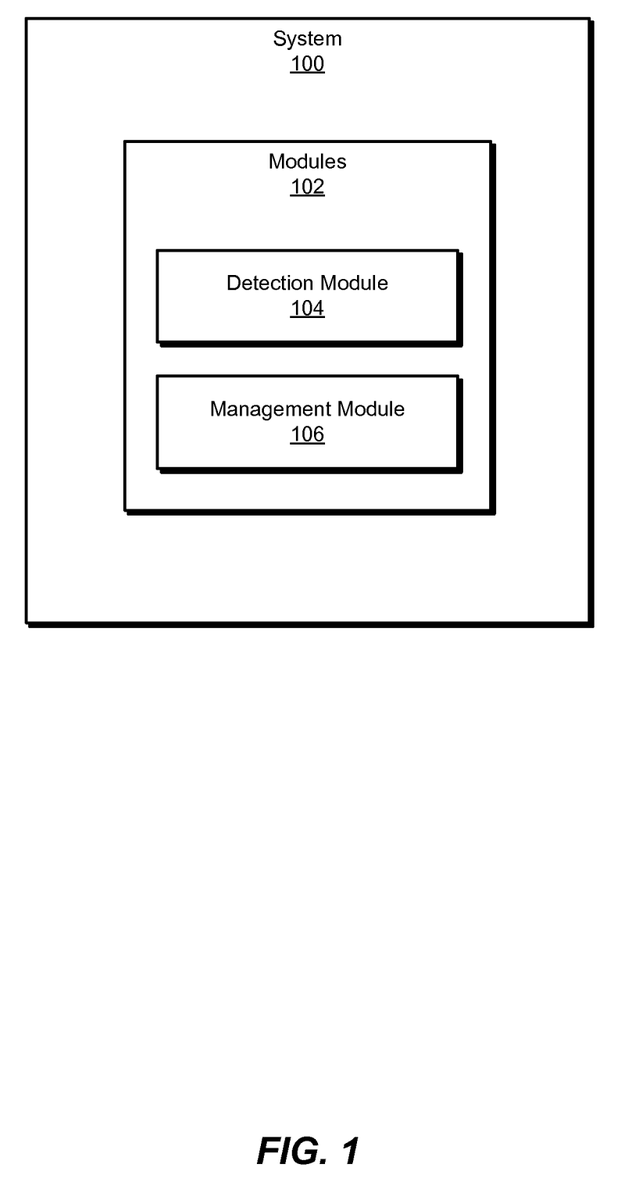
FIG. 1 is a block diagram of an exemplary system for managing off-host storage migration.
Figure 2:
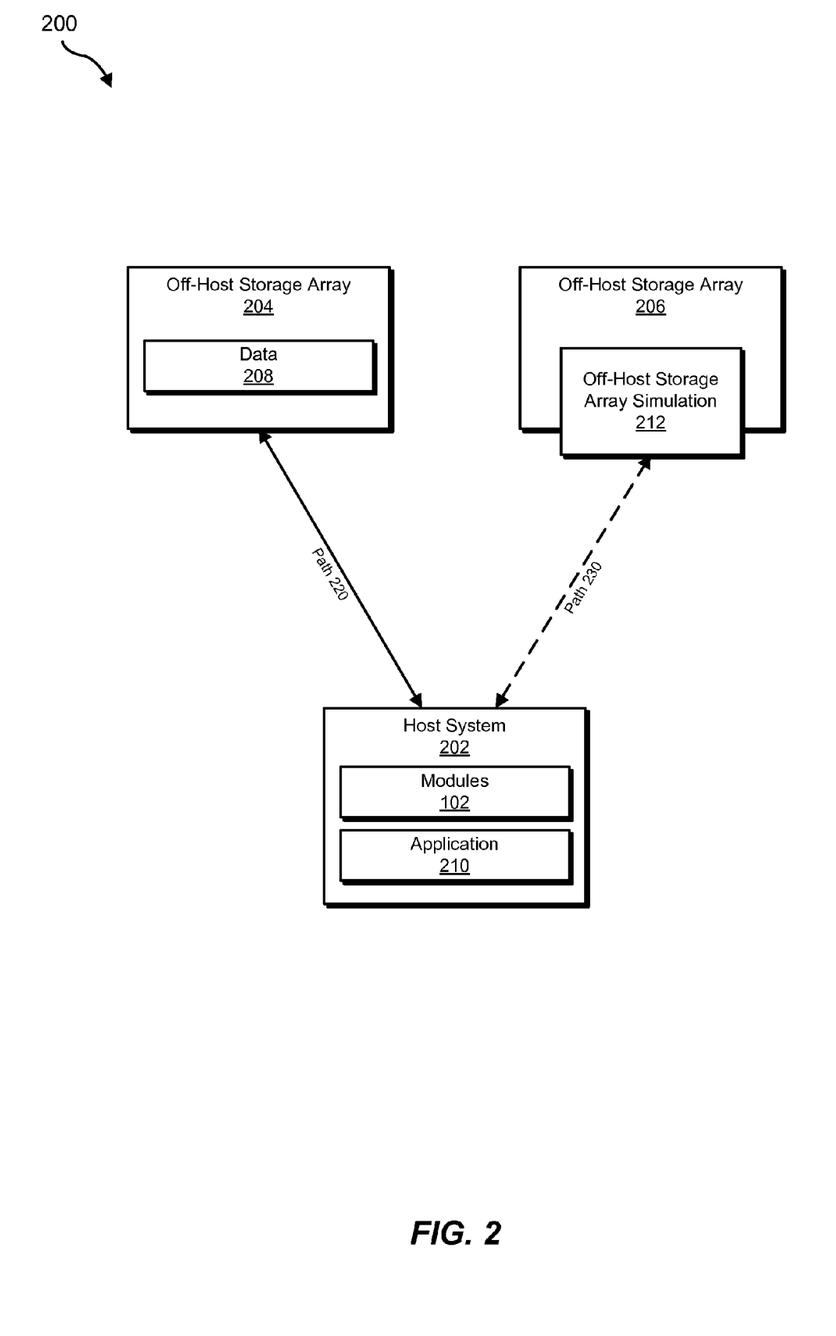
FIG. 2 is a block diagram of an exemplary system for managing off-host storage migration.
Figure 3:
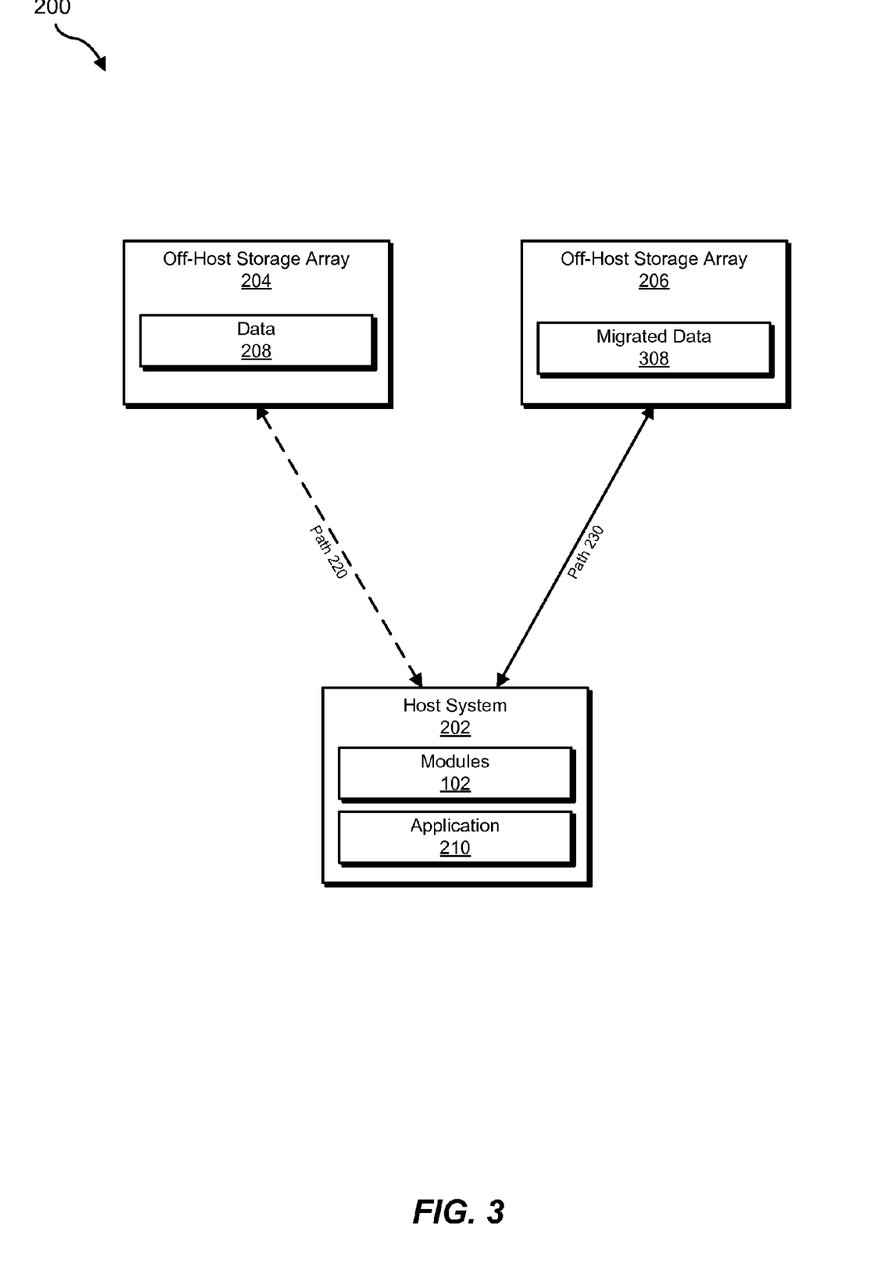
FIG. 3 is another block diagram of an exemplary system for managing off-host storage migration.

The following will provide, with reference to FIGS. 1-3, detailed descriptions of exemplary systems for managing off-host storage migration. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for managing off-host storage migration. As illustrated in this figure, exemplary system 100 may include one or more modules 102 for performing one or more tasks. For example, and as will be explained in greater detail below, exemplary system 100 may include a detection module 104 programmed to detect an attempt to perform non-disruptive data migration from an existing off-host storage array to a new off-host storage array by 1) identifying a new communication path that appears to a host system as a path from the host system to the existing off-host storage array, 2) determining whether the new communication path comprises a standby path that is not actively being used for communication between the host system and the existing off-host storage array, 3) when the new communication path is determined to comprise the standby path, determining whether the new communication path actually comprises a path to the new off-host storage array configured to appear to the host system as though it were the existing off-host storage array, and 4) when the new communication path is determined to comprise the path to the new off-host storage array, concluding that the non-disruptive data migration is being attempted.

In addition, and as will be described in greater detail below, exemplary system 100 may include a management module 106 programmed to perform at least one management operation with respect to the new off-host storage array and at least one processor configured to execute the detection module and the management module. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., host system 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIGS. 2 and 3, system 200 may include a host system 202.

In one embodiment, one or more of modules 102 from FIG. 1 may, when executed by at least one processor of host system 202, enable host system 202 to managing off-host storage migration. For example, and as will be described in greater detail below, one or more of modules 102 may cause host system 202 to detect an attempt to perform non-disruptive data migration from an existing off-host storage array to a new off-host storage array and/or to perform at least one management operation with respect to the new off-host storage array.

Host system 202 generally represents any type or form of computing device capable of reading computer-executable instructions. Examples of host system 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

As shown in FIG. 2, host system 202 may communication with off-host storage array 204 via a path 220. Host system 202 may also communicate with off-host storage array 206 via a path 230. Paths 220 and 230 may be implemented over any medium or architecture capable of facilitating communication or data transfer. For example, paths 220 and 230 may be implemented over, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Paths 220 and 230 may facilitate communication or data transfer using wireless or wired connections.

Off-host storage arrays 204 and 206 generally represent any type or form of sets of one or more storage devices located remotely from a host (e.g., host system 202) that utilizes the one or more storage devices. Off-host storage arrays may include any type, form, and/or or number of storage devices. For example, off-host storage arrays may include arrays of a plurality of hard disks, solid state drives, tape drives, and/or any combination of these or other types of storage devices. Furthermore, off-host storage arrays may be implemented in any suitable configuration. For example, off-host storage arrays may be implemented as Network Attached Storage (NAS) arrays, Storage Area Network (SAN) arrays such as modular SAN arrays or Monolithic SAN arrays, tiered storage arrays, and/or any other type or form of storage array.

Figure 4:
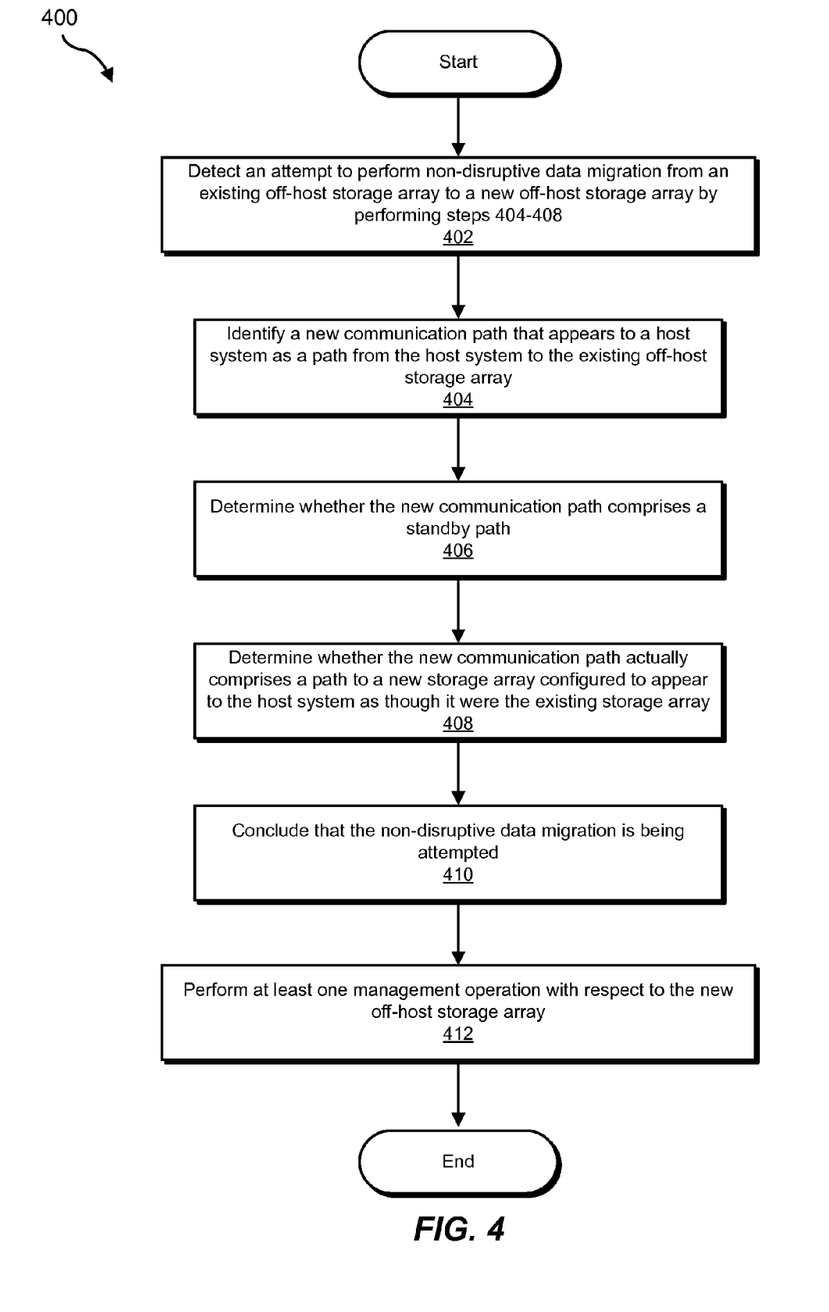
FIG. 4 is a flow diagram of an exemplary method for managing off-host storage migration.

FIG. 4 is a flow diagram of an exemplary computer-implemented method 400 for managing off-host storage migration. The steps shown in FIG. 4 may be performed by any suitable computer-executable code and/or computing system. In some embodiments, the steps shown in FIG. 4 may be performed by one or more of the components of system 100 in FIG. 1, system 200 in FIGS. 2 and 3, computing system 510 in FIG. 5, and/or portions of exemplary network architecture 600 in FIG. 6.

At step 402 in FIG. 4, one or more of the systems described herein may detect an attempt to perform non-disruptive data migration from an existing off-host storage array to a new off-host storage array by performing steps 404-408. For example, detection module 104 in FIG. 1 (which may, as detailed above, represent a portion of host system 202 in FIGS. 2 and 3) may detect an attempt to perform non-disruptive data migration from off-host storage array 204 to off-host storage array 206.

Detection module 104 may detect an attempt to perform non-disruptive data migration in a variety of contexts and manners. For example, detection module 104 may run continuously on host system 202 to check for non-disruptive data migration operations between off-host storage array 204 and an additional off-host storage array, such as off-host storage array 206. Alternatively, detection module 104 may periodically check for non-disruptive data migration according to a predetermined schedule (e.g., hourly, daily, weekly, etc.)

As used herein, the phrase non-disruptive data migration generally refers to any type or form of data migration that is transparent to and/or does not require involvement of a host system. For example, a non-disruptive data migration may be a migration from off-host storage array 204 to off-host storage array 206 that does not require involvement from host system 202. As another example, a non-disruptive data migration from off-host storage array 204 to off-host storage array 206 may include a migration operation performed without the knowledge of host system 202 (e.g., transparent to host system 202 such that host system 202 is unaware the migration is happening).

Non-disruptive migration may be performed by simulating a representation of an existing off-host storage array (e.g., off-host storage array 204) and presenting a new off-host storage array (e.g., off-host storage array 206) as though it were the existing off-host storage array. For example, a new off-host storage array to which data is being migrated may be configured with a Small Computing System Interface (SCSI) personality that is the same as a SCSI personality of a source array. The new (target) off-host storage array may be configured with the same VID value as the existing (source) off-host storage array, the same PID value as the existing off-host storage array, the same serial number as the existing off-host storage array, and/or any other identifying information that would make it appear as though it were the existing off-host storage array. In this manner, the new off-host storage array may be configured to appear as an additional standby path to the existing off-host storage array such that a host system does not know that the new off-host storage array is different than the existing off-host storage array (e.g., the host system does not know that the new standby path goes to the new off-host storage array).

FIG. 2 shows an example of an active path (e.g., path 220) to an existing off-host storage array (e.g., off-host storage array 204) and a standby path (e.g., path 230) to a new off-host storage array (e.g., off-host storage array 206). As also shown in FIG. 2, off-host storage array simulation 212 may make off-host storage array 206 appear to host system 202 as though it were off-host storage array 204.

After migration of data 208 from off-host storage array 204 to off-host storage array 206 is complete (e.g., as migrated data 308), path 220 to off-host storage array 204 may be changed to a standby path and path 230 to off-host storage array 206 may be changed to an active path, as shown in FIG. 3. The personality of off-host storage array 204 may be maintained on off-host storage array 206 as off-host storage array simulation 212 even when path 230 to off-host storage array 206 is activated. Steps 404-408 show how a host system (e.g., host system 202) may detect migration and transition to a new storage array even when the migration to a new storage array is transparent to the host system and/or when the new (target) storage array continues to present itself as the existing (source) storage array.

At step 404 in FIG. 4, one or more of the systems described herein may identify a new communication path that appears to a host system as a path from the host system to the existing off-host storage array. For example, detection module 104 may identify path 230 as a new communication path that appears to be a path to off-host storage array 204.

Detection module 104 may identify a new communication path in any suitable manner. For example, detection module 104 may be part of a dynamic multi-pathing software system that manages paths between a host system and one or more storage arrays. As such, detection module 104 may be involved in creation or management of path 230 and may detect path 230 by virtue of such involvement. Additionally or alternatively, detection module 104 may identify path 230 by monitoring for, checking for, or otherwise detecting new paths added between host system 202 and any storage arrays connected to host system 202.

At step 406 in FIG. 4, one or the systems described herein may determine whether the new communication path comprises a standby path that is not actively being used for communication between the host system and the existing off-host storage array. For example, detection module 104 may determine whether path 230 is passive (e.g., in standby mode). Detection module 104 may determine whether a path is in standby mode in any suitable manner. For example, detection module 104 may determine that a path is in standby mode by determining that no data is being transferred over the path, by identifying a flag or other information indicating that the path is in standby mode, and/or by using any other suitable path-mode detection mechanism.

At step 408 in FIG. 4, one or more of the systems described herein may, when the new communication path is determined to comprise the standby path, determine whether the new communication path actually comprises a path to the new off-host storage array configured to appear to the host system as though it were the existing off-host storage array. For example, detection module 104 may, when detection module 104 has determined that the new communication path is a standby path, then determine whether the new communication path (e.g., path 230) actually comprises a path to off-host storage array 206 configured to appear to host system 202 as though it were off-host storage array 204.

Detection module 104 may determine whether a new communication path actually comprises a path to a new storage array in one or more of a variety of different manners. For example, detection module 104 may use an in-band Small Computer System Interface (SCSI) inquiry command to determine that the new off-host storage array is different than the existing off-host storage array. For example, detection module 104 may use a vendor-specific SCSI inquiry command (as opposed to generic SCSI inquiry commands utilized by multiple storage vendors) to obtain information about the off-host storage array in question. Alternatively, detection module 104 may use a generic SCSI inquiry command to obtain information about the off-host storage array in question. Thus, even when off-host storage array 206 spoofs host system 202 with off-host storage array simulation 212, detection module 104 may use an in-band SCSI inquiry to vendor-specific information (as opposed to traditional SCSI available to the host) to determine that new off-host storage array 206 is different than existing off-host storage array 204.

Additionally or alternatively, detection module 104 may use an out-of-band array management interface to determine that a new communication path is from a different physical storage array than an existing off-host storage array to which the new communication path points. Detection module 104 may query an array management interface that provides information (e.g., VID values, PID values, LUN serial numbers, transport identifiers, fibre channel world wide numbers, and/or any other identification information assigned to a communication path and/or storage array etc.) about off-host storage array 206 that indicates off-host storage array 206 is different than off-host storage array 204. For example, detection module 104 may determine that the new communication path has a transport identifier (or other identification value) that does not belong to the existing off-host storage array.

At step 410 in FIG. 4, one or more of the systems described herein may, when the new communication path is determined to comprise the path to the new off-host storage array, conclude that the non-disruptive data migration is being attempted. For example, detection module 104 may conclude that a non-disruptive data migration is being performed between off-host storage array 204 and off-host storage array 206 when detection module 104 determines that path 230 is actually to off-host storage array 206 and not to off-host storage array 204.

At step 412 in FIG. 4, one or the systems described herein may perform at least one management operation with respect to the new off-host storage array. For example, management module 106 may perform at least one management operation with respect to off-host storage array 206.

Management module 106 may perform one or more of any suitable type of management operations. For example, management module 106 may detect the configuration of off-host storage array 206 (e.g., the type of disks found in off-host storage array 206, an arrangement of storage devices within storage array 206, and/or any other suitable information about off-host storage array 206). Management module 106 may then determine that the configuration of off-host storage array 206 is different than off-host storage array 204. For example, management module 106 may determine that off-host storage array 206 has different types of storage devices than off-host storage array 204, that off-host storage array 206 has a different configuration of devices than off-host storage array 204, and/or that off-host storage array 206 and off-host storage array 204 differ in any other manner.

Management module 106 may, based on the differences between existing off-host storage array 204 and new off-host storage array 206, change at least one data allocation policy that defines how data is to be stored in new off-host storage array 206. For example, in migrating from off-host storage array 204 to off-host storage array 206, lower priority may have been moved to a relatively higher quality of service storage device (e.g., a faster storage device, a storage device with a better network connection, a more reliable storage device, etc.), while higher quality data may have been moved to a relatively lower quality of service device (e.g., a slower storage device, a storage device with a slower network connection, a less reliable storage device, etc). Management module 106 may implement a change in a data tiering policy that would move the higher priority data to the higher quality of service storage device and move the lower priority data to the lower quality of service storage device on off-host storage array 206.

In some embodiments, management module 106 may perform the management operation by notifying an administrator of the host system that the data has been migrated from the existing off-host storage array to the new off-host storage array. Management module 106 may also notify a high availability file system of host system 202 and/or may notify any other suitable system about the migration from off-host storage array 204 to off-host storage array 206.

In some embodiments, management module 106 may determine that the non-disruptive data migration has completed by detecting that the new communication path (e.g., path 230) has been activated and/or by detecting that the existing path to off-host storage array 204 (e.g., path 220) has been changed to a standby mode. In such embodiments, management module 106 may perform the management operation in response to determining that the non-disruptive data migration has completed. In such embodiments, performing the management operation may include identifying an application on host system 202 (e.g., application 210) that stores data to the existing off-host storage array and/or otherwise utilizes off-host storage array 204. Management module 106 may then make application 210 aware of off-host storage array 206 such that application 210 directly accesses off-host storage array 206 instead of continuing to communicate with off-host storage array 206 through a personality of off-host storage array 204. FIG. 3 shows an example of direct communications between host system 202 and off-host storage array 206 without off-host storage array simulation 212 spoofing host system 202 into seeing off-host storage array 206 as though it were off-host storage array 204.

In some embodiments, management module 106 may perform the management operation by determining that a migration between off-host storage array 204 and off-host storage array 206 resulted in misconfiguration of data for an application. For example, management module 106 may determine that only a portion of the data used by application 210 is being migrated from off-host storage array 204 to off-host storage array 206, which would result in data being split between off-host storage array 204 and off-host storage array 206. Determining that data of application 210 is split between off-host storage array 204 and off-host storage array 206 may involve identifying the application data set (i.e., a set of storage array disks that application 210 operates on) and treating the set of storage array disks as a unit. In some embodiments, information treating the set of storage array disks as a unit can be provided to storage array 204 before or during migration (e.g., while setting up the off-host array migration to storage array 206) to avoid misconfiguration.

When data of an application is split between off-host storage array 204 and off-host storage array 206, management module 106 may respond to this determination of misconfigured data for application 210 by remediating a storage configuration for application 210. For example, management module 106 may move the remainder of the data for application 210 to off-host storage array 206. Management module 106 may also remediate the storage configuration for application 210 by notifying storage array 204 about the split data set to enable the enable the storage array to properly complete or perform off-host migration of data for the application (i.e., migrating all of the application's data). Management module 106 may also remediate the storage configuration for application 210 in any other suitable manner.

Figure 5:
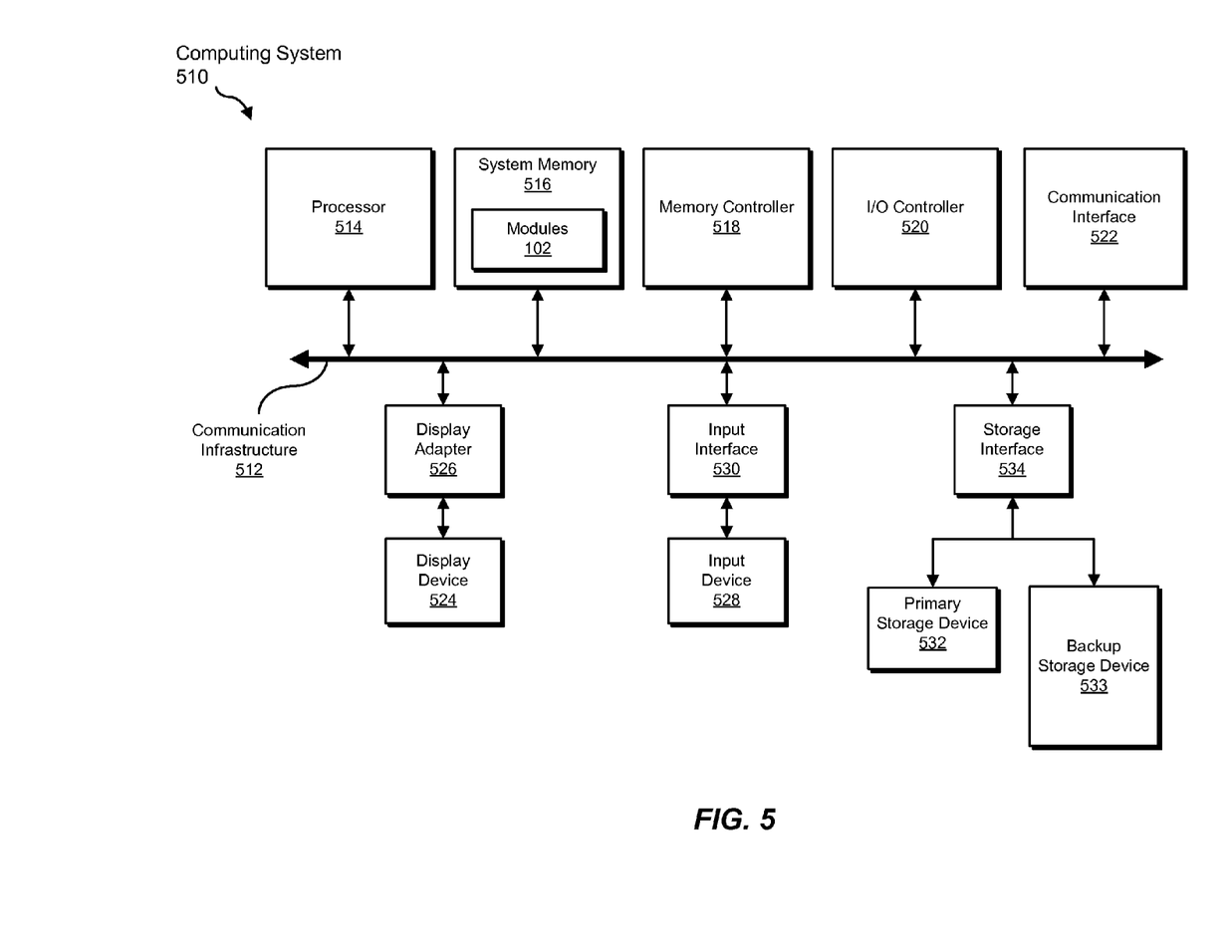
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the detecting, identifying, determining, concluding, changing, using, failing, performing, and/or notifying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
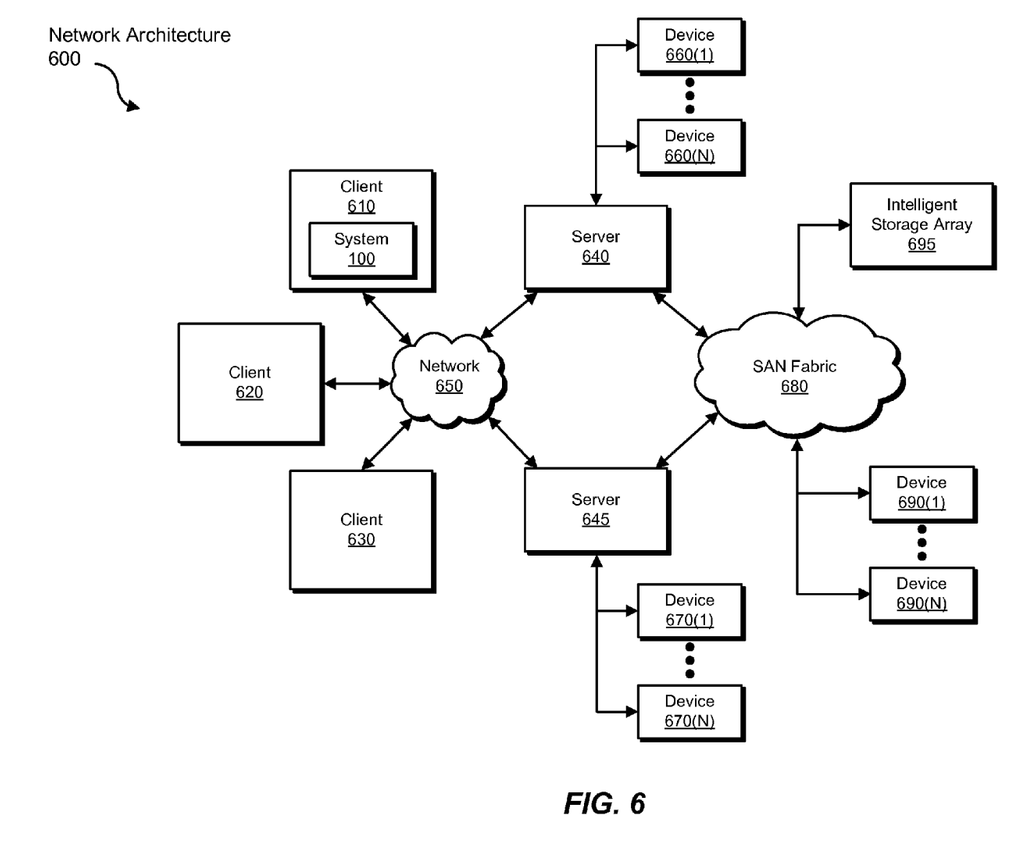
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the detecting, identifying, determining, concluding, changing, using, failing, performing, and/or notifying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for managing off-host storage migration.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a host system into a migration detection system by configuring memory and/or other components of the host system to detect off-host storage array migrations.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing off-host storage migration, at least a portion of the method being performed by a computing device comprising at least one processor, the method comprising:

detecting an action to perform non-disruptive data migration from an existing off-host storage array to a new off-host storage array by:
 1) identifying a new communication path that is established in a manner that a host system perceives the new communication path as a path from the host system to the existing off-host storage array,
 2) determining whether the new communication path comprises a standby path that is not actively being used for communication between the host system and the existing off-host storage array,
 3) when the new communication path is determined to comprise the standby path, determining whether the new communication path actually comprises a path to the new off-host storage array configured in a manner that the host system perceives the new off-host storage array as the existing off-host storage array by performing at least one of:

using an inband Small Computer System Interface (SCSI) inquiry command to determine that the new off-host storage array is different than the existing off-host storage array;

using an out-of-band array management interface to determine that the new communication path is from a different physical storage array than the existing off-host storage array;

detecting that a communication channel transport identifier for the new communication path does not belong to the existing off-host storage array, 4) when the new communication path is determined to comprise the path to the new off-host storage array, concluding that the non-disruptive data migration is being performed;

performing at least one management operation with respect to the new off-host storage array.

2. The computer-implemented method of claim 1, wherein performing the at least one management operation comprises:

detecting a configuration of the new off-host storage array;

determining that the configuration of the new off-host storage array is different than a configuration of the existing off-host storage array;

changing, based on the difference between the existing off-host storage array and the new off-host storage array, at least one data allocation policy that defines how data is to be stored in the new off-host storage array.

3. The computer-implemented method of claim 2, wherein the at least one data allocation policy comprises:

a data tiering policy that identifies a first type of data that is to be stored to a higher-quality storage device and a second type of data that is to be stored to a lower-quality storage device.

4. The computer-implemented method of claim 1, wherein determining whether the new communication path actually comprises the path to the new off-host storage array configured in the manner that the host system perceives the new off-host storage array as the existing off-host storage array comprises:

using the inband SCSI inquiry command to determine that the new off-host storage array is different than the existing off-host storage array.

5. The computer-implemented method of claim 1, wherein determining whether the new communication path actually comprises the path to the new off-host storage array configured in the manner that the host system perceives the new off-host storage array as the existing off-host storage array comprises performing at least one of:

using the out-of-band array management interface to determine that the new communication path is from a different physical storage array than the existing off-host storage array;

detecting that the communication channel transport identifier for the new communication path does not belong to the existing off-host storage array.

6. The computer-implemented method of claim 1, further comprising:

determining that the non-disruptive data migration has completed by detecting at least one of the new communication path being activated and/or an existing path to the existing off-host storage array being changed to a standby mode, wherein the at least one management operation is performed in response to determining that the non-disruptive data migration has completed.

7. The computer-implemented method of claim 6, wherein performing the at least one management operation comprises:

identifying an application on the host system that stores data to the existing off-host storage array;

making the application aware of the new off-host storage array.

8. The computer-implemented method of claim 6, wherein performing the at least one management operation comprises:

identifying an application on the host system that stores data to the existing off-host storage array;

determining that only a portion of data being used by the application is being migrated from the existing off-host storage array to the new off-host storage array;

in response to determining that only a portion of data being used by the application is being migrated from the existing off-host storage array to the new off-host storage array, performing the at least one management operation by remediating storage configuration for the application.

9. The computer-implemented method of claim 1, wherein performing the at least one management operation comprises:

notifying an administrator of the host system that data has been migrated from the existing off-host storage array to the new off-host storage array.

10. A system for managing off-host storage migration, the system comprising:

a detection module programmed to detect an action to perform non-disruptive data migration from an existing off-host storage array to a new off-host storage array by:

1) identifying a new communication path that is established in a manner that a host system perceives the new communication path as a path from the host system to the existing off-host storage array, 2) determining whether the new communication path comprises a standby path that is not actively being used for communication between the host system and the existing off-host storage array, 3) when the new communication path is determined to comprise the standby path, determining whether the new communication path actually comprises a path to the new off-host storage array configured in a manner that the host system perceives the new off-host storage array as the existing off-host storage array by performing at least one of:

using an inband Small Computer System Interface (SCSI) inquiry command to determine that the new off-host storage array is different than the existing off-host storage array;

using an out-of-band array management interface to determine that the new communication path is from a different physical storage array than the existing off-host storage array;

detecting that a communication channel transport identifier for the new communication path does not belong to the existing off-host storage array, 4) when the new communication path is determined to comprise the path to the new off-host storage array, concluding that the non-disruptive data migration is being performed;

a management module programmed to perform at least one management operation with respect to the new off-host storage array;

at least one processor configured to execute the detection module and the management module.

11. The system of claim 10, wherein the management module is programmed to perform the at least one management operation by:

detecting a configuration of the new off-host storage array;

determining that the configuration of the new off-host storage array is different than a configuration of the existing off-host storage array;

changing, based on the difference between the existing off-host storage array and the new off-host storage array, at least one data allocation policy that defines how data is to be stored in the new off-host storage array.

12. The system of claim 11, wherein the at least one data allocation policy comprises:

a data tiering policy that identifies a first type of data that is to be stored to a higher-quality storage device and a second type of data that is to be stored to a lower-quality storage device.

13. The system of claim 10, wherein determining whether the new communication path actually comprises the path to the new off-host storage array configured in the manner that the host system perceives the new off-host storage array as the existing off-host storage array comprises:

using the inband SCSI inquiry command to determine that the new off-host storage array is different than the existing off-host storage array.

14. The system of claim 10, wherein determining whether the new communication path actually comprises the path to the new off-host storage array configured in the manner that the host system perceives the new off-host storage array as the existing off-host storage array comprises performing at least one of:

using the out-of-band array management interface to determine that the new communication path is from a different physical storage array than the existing off-host storage array;

detecting that the communication channel transport identifier for the new communication path does not belong to the existing off-host storage array.

15. The system of claim 10, wherein the management module is programmed to:

determine that the non-disruptive data migration has completed by detecting at least one of the new communication path being activated and/or an existing path to the existing off-host storage array being changed to a standby mode, wherein the at least one management operation is performed in response to determining that the non-disruptive data migration has completed.

16. The system of claim 15, wherein the management module is programmed to perform the at least one management operation by:

identifying an application on the host system that stores data to the existing off-host storage array;

making the application aware of the new off-host storage array.

17. The system of claim 16, wherein the management module is programmed to perform the at least one management operation by:

providing information treating devices in the existing off-host storage array as a unit to the existing off-host storage array to avoid misconfiguration of data of the application during migration from the existing off-host storage array to the new off-host storage array.

18. The system of claim 10, wherein the management module is programmed to perform the at least one management operation by:

notifying an administrator of the host system that data has been migrated from the existing off-host storage array to the new off-host storage array.

19. A non-transitory computer-readable-storage medium comprising one or more computer-executable instructions that, when executed by at least one processor of a computing device, cause the computing device to:

detect an action to perform non-disruptive data migration from an existing off-host storage array to a new off-host storage array by:

1) identifying a new communication path that is established in a manner that a host system perceives the new communication path as a path from the host system to the existing off-host storage array, 2) determining whether the new communication path comprises a standby path that is not actively being used for communication between the host system and the existing off-host storage array, 3) when the new communication path is determined to comprise the standby path, determining whether the new communication path actually comprises a path to the new off-host storage array configured in a manner that the host system perceives the new off-host storage array as the existing off-host storage array by performing at least one of:

using an inband Small Computer System Interface (SCSI) inquiry command to determine that the new off-host storage array is different than the existing off-host storage array;

using an out-of-band array management interface to determine that the new communication path is from a different physical storage array than the existing off-host storage array;

detecting that a communication channel transport identifier for the new communication path does not belong to the existing off-host storage array, 4) when the new communication path is determined to comprise the path to the new off-host storage array, concluding that the non-disruptive data migration is being performed;

perform at least one management operation with respect to the new off-host storage array.

20. The non-transitory computer-readable-storage medium of claim 19, wherein the one or more computer-executable instructions are further programmed to, when executed by the at least one processor of the computing device, cause the computing device to:

determine that the non-disruptive data migration has completed by detecting at least one of the new communication path being activated and/or an existing path to the existing off-host storage array being changed to a standby mode, wherein the at least one management operation is performed in response to determining that the non-disruptive data migration has completed.

* * * * *